June 12, 1928.  1,673,654
J. M. WEED
APPARATUS AND METHOD FOR GASEOUS REACTIONS
Filed April 23, 1924  4 Sheets-Sheet 2
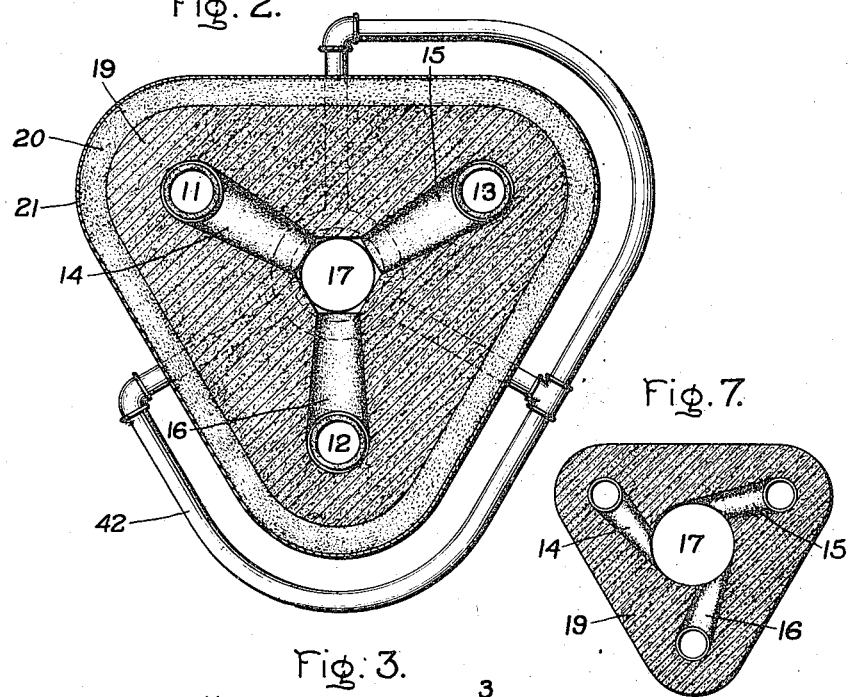
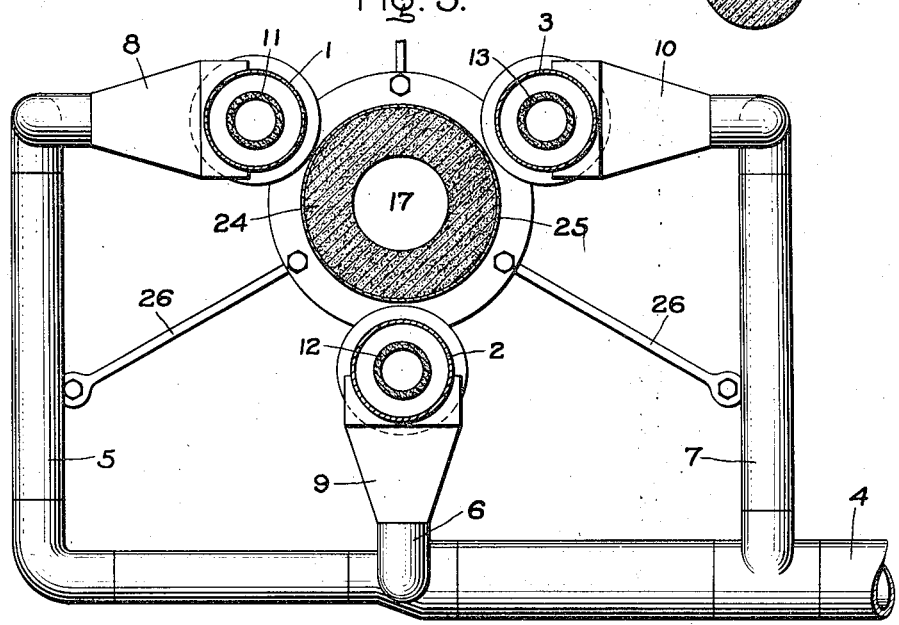
Inventor:
James M. Weed,
by [signature]
His Attorney

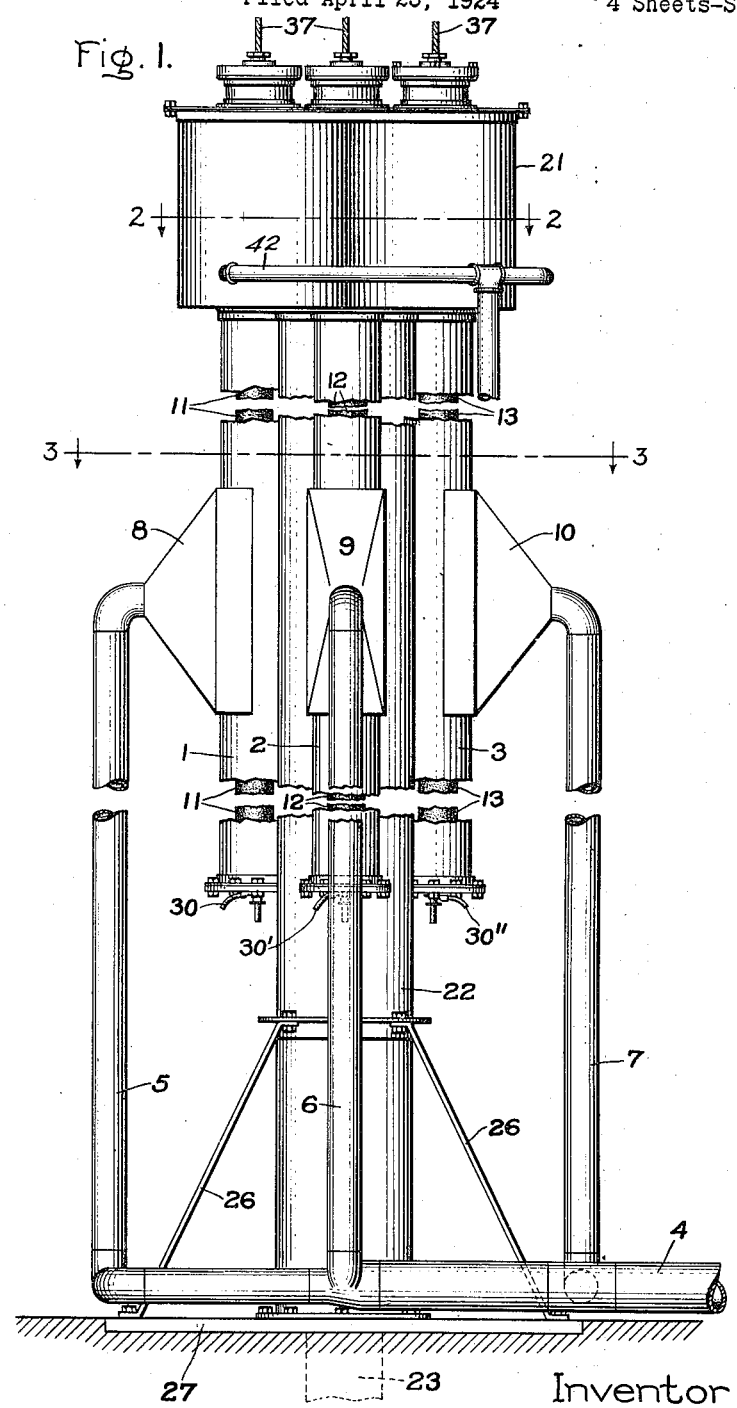

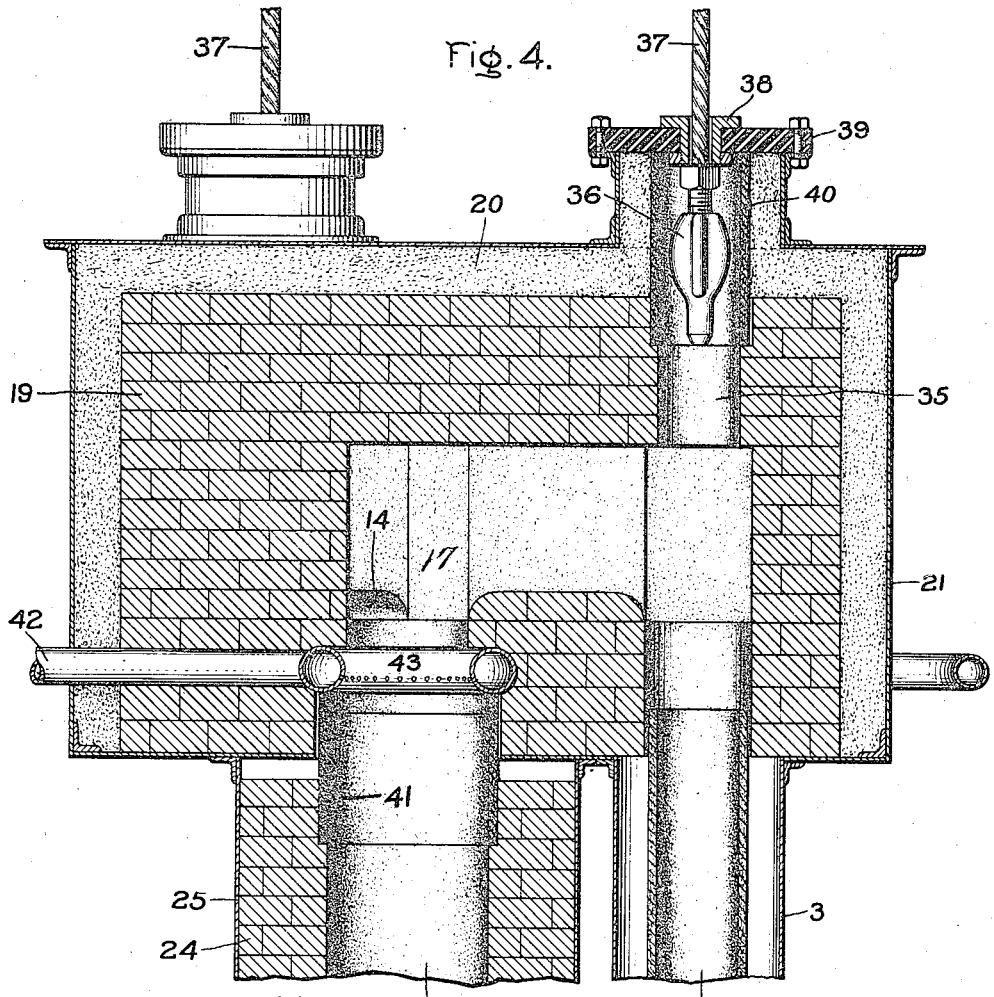
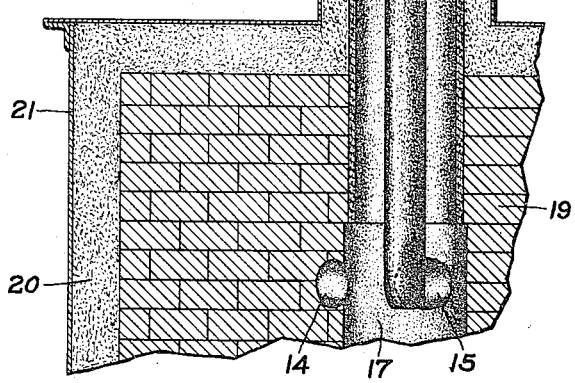
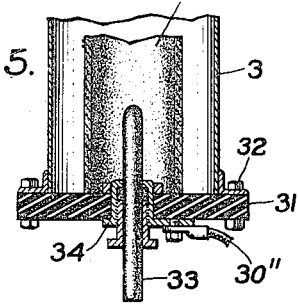
Inventor:
James M. Weed,
by His Attorney.

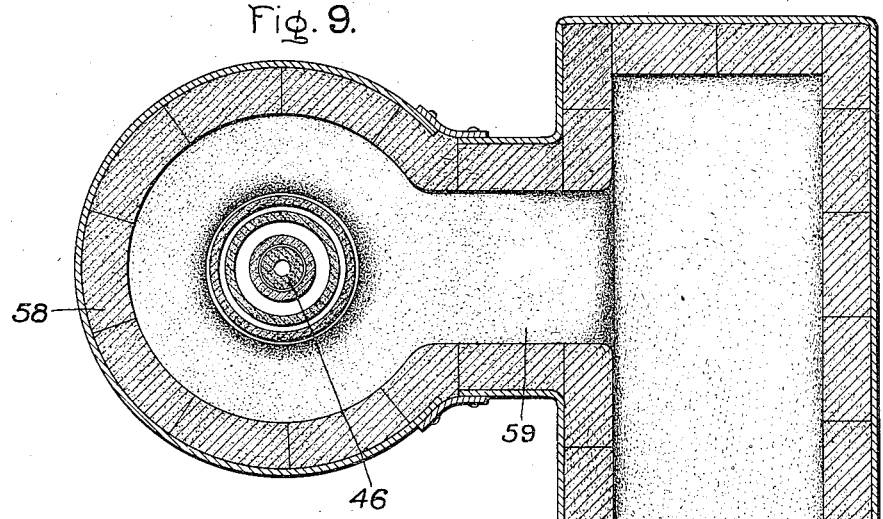
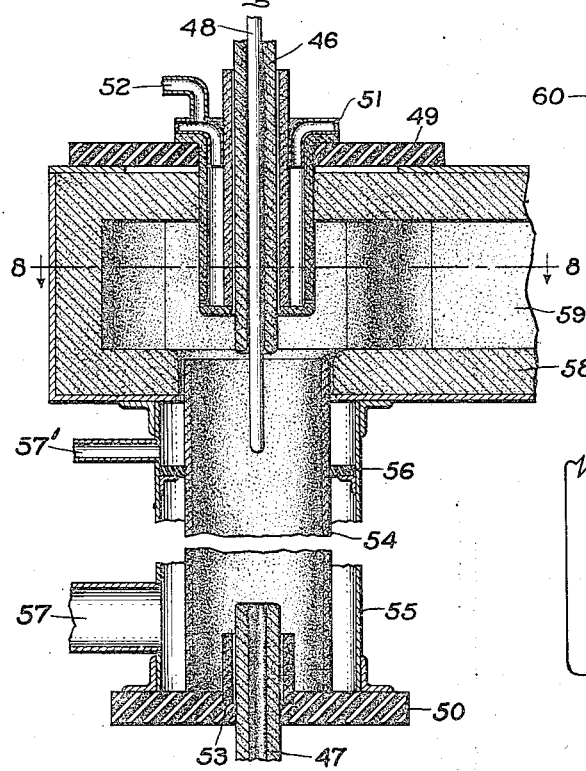
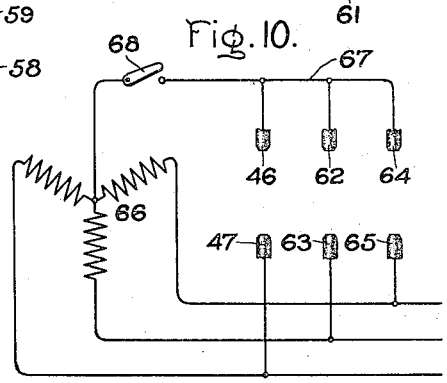

Patented June 12, 1928.

1,673,654

UNITED STATES PATENT OFFICE.

JAMES M. WEED, OF SCOTIA, NEW YORK, ASSIGNOR TO GENERAL ELECTRIC COMPANY, A CORPORATION OF NEW YORK.

APPARATUS AND METHOD FOR GASEOUS REACTIONS.

Application filed April 23, 1924. Serial No. 708,594.

The present invention relates to the carrying out of gaseous reactions by electric arcs, such, for example, as the oxidation of nitrogen. As a consequence of my invention, I have provided an apparatus and method which will give a greater yield of reaction products for a given input of electrical energy, and which will operate with greater stability and with a higher power factor than was heretofore attainable in this field. Other advantages of my improved apparatus, such as compactness and simplicity of construction and of operation will appear when it is compared herein with prior devices.

In some of the arc furnaces used for the oxidation of atmospheric nitrogen, electric arcs are operated in metal tubes which act as electrodes for the arc and which are rapidly consumed. Air is introduced into the arc chamber or tube at some definite spot, as at one end of the arc, and is circulated about the arc. The individual arcs usually are operated independently in different phases of a polyphase electric supply system, and are apt to cause unbalancing of the electric supply system.

In the apparatus embodying my invention, electric arcs are operated in tubes of refractory material, which do not constitute electrodes, and which are sufficiently porous to permit the introduction of the gaseous reaction mixture by seepage through the walls of the tubes. By this construction, as hereinafter explained, the refractory tubes are cooled and the incoming gas is preheated and fed into the arc quietly and uniformly from all sides and throughout its length, or a major portion thereof.

Apparatus which embodies my invention in one form provides for and is operated with a three phase arc, the phases having a common junction or neutral point, from which the branch arcs of the different phases lead to their respective line electrodes. These branch arcs extend through separate reaction chambers or arc tubes. Stability of the arcs and balance of the system are promoted by the fact that when the resistances of the different arc branches vary with respect to each other, the potential at the junction point is automatically shifted so that the greater voltage is yielded to that branch of the arc which happens at any moment to have a greater resistance. Moreover, the resistances of the respective branches are more constant than those of prior arc furnaces, on account of the quiet way in which the air is admitted by seepage through the walls of the arc tubes.

Other features of my invention which will be described in this specification consist in introducing materials to the arc zone which are capable, under the conditions of operation, of ionizing the gases and thereby facilitating chemical reaction, and also, in a specific method of suddenly cooling of the gases below the critical temperature, when leaving the influence of the arc, in order to avoid losses of product due to the chemical reaction of disassociation incident to slow cooling, and without dilution of the product.

For a complete understanding of my invention, the novel features of which will be pointed out with particularity in the appended claims, reference may be had to the following specification, taken in connection with the accompanying drawings. Fig. 1 is a front elevation of the apparatus embodying my invention; Fig. 2 is a horizontal section taken on the lines 2—2 of Fig. 1; Fig. 3 is another horizontal section taken on the line 3—3; Fig. 4 is a vertical section of the upper end of the apparatus showing one of the starting electrodes; Fig. 5 is a vertical section of the lower end showing one of the main operating electrodes; Fig. 6 is a vertical section of a portion of the furnace containing a neutral electrode which, if used, will be located in the neutral chamber which is common to the three branches of the arc; Fig. 7 shows a modified arrangement of the passages leading from the three arc tubes to the collecting chamber; Figs. 8 and 9 are vertical and longitudinal sections respectively of a modified apparatus wherein separate arcs are operated in the respective phases, and Fig. 10 is a diagram of electric connections for an apparatus such as shown in Figs. 8 and 9.

The apparatus shown in Fig. 1 is a complete three phase furnace comprising three, vertically positioned, parallel reaction chambers or arc tubes (shown broken at two points along their length) which, in a plan view, are located at the vertices of an equilateral triangle. Assuming that the apparatus is to be used for the production of nitric oxide, air is introduced under pressure from a supply pipe 4, by the conduits 5, 6, 7, through the funnel-shaped junction boxes 8, 9, 10, into the air chambers between the steel casings 1, 2, 3, and the walls of the arc tubes 11, 12, 13, contained within said casings. Arcs for producing the reaction between the gases (nitrogen and oxygen in the present instance) are operated within the tubes 11, 12, 13, best seen in Figs. 2 and 3. The gases (air, for example) will pass through the walls of these tubes, which consist of some suitable porous, refractory material, as for example, alundum or carborundum, and come into contact with the arcs in the respective tubes without distorting the arcs. Within the tubes the gas will collect in longitudinal streams, passing upward, whence it will discharge through horizontal passages 14, 15, 16, into the common neutral chamber 17, seen in Figs. 3 and 4, and thence down through the vertical passage 18. The passages 14, 15, 16 are formed within walls 19 of highly refractory material, such as magnesite, or zirconium silicate which in turn are enclosed by a layer 20 of suitable heat insulating material. An outer wall or casing 21 consisting of sheet steel, or the like, encloses the refractory and insulating materials to give stability to the structure.

As shown in Fig. 1, the entire apparatus is supported by the stack 22, which contains the vertical passage 18 through which the gases are discharged into an outgoing duct 23. This duct carries them to cooling and suitable absorption apparatus (not here shown). The vertical stack 22 is constituted by walls of fire brick 24 (Fig. 4) and an outer steel casing 25, which is braced by rods 26, passing to a bedplate 27 as shown in Fig. 1.

The lower ends of the arc tubes 11, 12, 13 are provided with electrodes 33, (Fig. 5) passing through stuffing boxes 34, mounted in the plates 31 of soapstone or other suitable insulating material, which close the ends of the arc tubes and of the air chambers between these tubes and their outer casings. These electrodes may consist of rods of carbon, steel or other conductive material, and are provided, as shown in Fig. 1, with suitable terminals and conductors 30, 30' and 30'', for connection to a three phase line or source of current.

The construction of the heads of the arc tubes is shown in Fig. 5. The plate 31 is fastened by bolts 32 to flanges at the ends of the steel casings, as shown in the drawing. The stuffing box 34 is made gas-tight by a packing of finely stranded copper or the like. The electrodes are fed into the arc tubes as they are consumed, either automatically by some suitable feeding mechanism located on the outside or, as the occasion demands, by hand by an operator, depending upon the conditions under which the furnace is operated.

Aligned with the arc tubes 11, 12, 13, at the opposite ends from the electrodes described above, is a second set of tubes, or conduits, one of which is 35 in Fig. 4. In the remote end of the tube 35 is located a starting electrode 36, which is connected to a conductor 37, passing loosely through a bushing 38. This bushing is mounted in a soapstone plate 39, the plate being bolted to a flange on the steel shell 21 and closing the upper end of the tube 35. The starting electrode 36, shown convolute in form, may consist of copper, or other suitable conducting material. It may be lowered by means of the conductor 37 through the tube 35 into and through the arc tube located opposite, so as to make contact with the electrode 33. A lining cylinder 40 is provided at the upper end of the conduit 35 to keep the powdered heat insulating material in place.

When the starting electrode 36 (and in the same way the other starting electrodes) is withdrawn from contact with the lower electrode 33, assuming a suitable voltage applied, an arc will form between said lower electrode and the starting electrode, and will follow the latter axially through the arc tube 13, and upon reaching the passages 14, 15, 16, the arcs in the three respective arc tubes 11, 12, 13 will be blown together and will unite in the neutral chamber 17, freeing themselves of their own accord from the starting electrodes, and forming a three phase arc having its neutral or junction point in the neutral chamber 17. Current from each leg of the three phase line, entering the furnace through its respective electrode 33, flows through the corresponding branch of the arc to the neutral point, and thence finds return paths to the other two legs of the line through the other two branches of the arc, just as in any Y-connected three phase apparatus.

From the neutral chamber 17, the heated gases escape from the influence of the arc downward through the vertical passage 18. It is desired at this point where they leave the arc, to effect as sudden cooling of the gases as possible to a temperature lower than the critical temperature above which rapid disassociation of the product into its constituent gases occurs, in order to avoid loss of product due to this cause. This cooling is effected by the sudden admixture of cool gas supplied through the pipe 42 shown in Figs. 1 and 4. This pipe terminates in a ring-shaped tuyère 43 surrounding the throat of the passage 18, this tuyère being provided with numerous small openings through which streams of the cool gas are blown from all sides into the discharging heated gas. In order to avoid a reduction of the concentration of the product in the gases, this cooling gas may be constituted by a part of the gases which have previously passed through the furnace and which have been subsequently cooled.

A refractory lining cylinder 41 is provided at the upper end of the passage 18, to bridge the junction of the firebrick walls 24 with the highly refractory walls surrounding the neutral chamber 17. The neutral chamber may be lined with a material such as zirconium oxide, or the oxide of an alkaline earth, or rare earth metal, which is capable of withstanding high temperatures and has at the same time the property, when incandescent, of setting up very short wave length radiations which exert an ionizing effect on the gases. This ionizing effect facilitates the chemical reaction, and thus increases the concentration of the nitric oxide, producing a higher yield than would be obtained from the purely thermal effect.

An alternative method of introducing the materials, such as the oxides of rare earths, which by short wave length radiations will produce the ionizing effect referred to above, is in the form of a neutral electrode 44, shown in Fig. 6, extending down into the neutral chamber 17. The walls of the chamber in this case might be of ordinary highly refractory materials. The electrode 44 is of the nature of a second class conductor, being conductive at high temperatures, with the result that the neutral point of the arc would seat itself thereon. Provision may be made for feeding this electrode into the neutral chamber as it is gradually dissipated by the action of the arc.

Still another method of supplying the ionizing material is by blowing it into the neutral chamber in powdered form, through a nozzle.

An alternative arrangement of the passages 14, 15, 16 with respect to the neutral chamber 17 is shown in Fig. 7. This arrangement provides for the discharge of the gases and arc streams into the neutral chamber in a tangential direction around its periphery. This will give a whirling motion, or pinwhel effect, in the chamber whereby a larger percentage of the gas will be brought into intimate relation with the arc, thus effecting a higher average percentage of the reaction product. The ends of two of these tangentially placed passages are shown in Fig. 6.

As already noted above, the seepage of the gases through the walls of the arc tubes 11, 12, 13, along their entire lengths, provides favorable conditions to the stability of the arc and the steady procedure of the chemical reaction. This passage of the air through the walls of the arc tubes also serves the additional purposes of preheating the air and at the same time cooling the walls of the arc tubes In the furnace as above described, the neutral potential at the junction of the arcs is "floating" or free to shift with respect to the potentials of the line electrodes 33. As already stated, this action yields a greater voltage to any branch of the arc which may happen to have a greater resistance at any particular instant. This favorable condition makes it possible to obtain arc stability in this furnace with a minimum amount of reactance, thus securing a higher power factor than is obtainable in single phase furnaces with constant voltages impressed, or in three phase furnaces having fixed neutral points.

The advantage of a "floating neutral", the introduction of the reaction gases through a porous wall and other advantageous features of my invention may be secured in an apparatus comprising separate single phase furnaces, the arc chamber of each furnace being provided with two electrodes as shown in Fig. 8. An arc is operated in each of these chambers between electrodes 46 and 47, which conveniently are hollow. An arc may be started between these electrodes by introducing a starting electrode, constituted by a conductive rod 48, through one of the electrodes 46 into contact with the cooperating electrode 47 and then withdrawing the rod. The arc will follow the starting electrode 48 and fasten itself upon the electrode 46 as the starting electrode is withdrawn therefrom. The arc will then continue to operate between the main electrodes 46 and 47. The electrodes 46 and 47 may consist of carbon, or other suitable conductive material, and may contain an ionizing admixture, such as oxides of rare earth metals.

Through the hollow electrodes, thermo couples for controlling the regulation of an automatic electrode feeding mechanism may be introduced. These parts have not been shown here as they form no part of this invention.

These electrodes project through plates 49 and 50 consisting of suitable insulating material. The electrode 46 is surrounded by a hollow porous refractory casing 51, into which gases, previously acted upon by the arc and then cooled, are introduced by an inlet tube 52. A small portion of these gases, by seeping through the pores of the casing, keep it and the sides of the electrode 46 cool. The balance of these cool gases blow in jets through openings around the outer perimeter of the lower end of the casing, thereby helping to suddenly cool the gaseous product of the arc at the point where it is discharging from the arc. The electrode 47 also is surrounded by a refractory casing 53 which does not require any special provision for cooling since the heated gases are flowing away from this electrode and toward electrode 46.

As in the case of the apparatus illustrated in Fig. 1, the arc chambers of Fig. 8 are surrounded by porous refractory walls 54 consisting of materials, such as alundum or carborundum, and these refractory arc tubes are enclosed in an external metal casing 55. The space between the arc tube 54 and the casing 55 is divided in a horizontal plane, near the upper end, by a diaphragm 56. Into the space below this diaphragm air or other gases to be acted upon by the arc are introduced through an inlet tube 57, and these gases percolate through the wall of the arc tube 54 into the arc uniformly along its axis. Into the space above the diaphragm 56 gases previously acted upon by the arc and then cooled are introduced by an inlet tube 57'. A small portion of these gases pass through the upper part of the porous wall 54, thereby keeping it cool, and the balance blows in jets through the spaces between the upper rim of this wall and the lining 58, thereby cooperating with the jets discharging from the lower end of the hollow casing 51 in suddenly cooling the gaseous product of the arc at the region where it is discharging from the arc. The partially cooled gaseous reaction mixture then passes into a conduit 59 which discharges, together with other conduits from similar arc chambers, as indicated at 60 in Fig. 9, into a collecting conduit 61 whereby the gases are conducted to suitable cooling and absorption devices.

Fig. 10 shows diagrammatically three sets of electrodes 46 and 47, 62 and 63, 64 and 65, corresponding to three single phase furnaces such as the one described above, connected to a three-phase, star-connected transformer 66. The electrodes 46, 62 and 64 of these furnaces are connected together by a conductor 67, and they are connected through a switch 68 to the neutral point of the transformer 66 while the arcs are being started. When the arcs are all operating, the switch 68 is opened and the arcs thereafter operate with a shifting or "floating" neutral potential as already described above in connection with the three phase furnace. The common potential of the three electrodes 46, 62 and 64 in this case corresponds to the potential of the junction of the three branches of the three phase arc. When the resistances of the arcs in the separate single phase furnaces vary with respect to each other, the common neutral potential of the three electrodes 46, 62 and 64 is automatically shifted from instant to instant so that the greater voltage is at all times yielded to the furnace in which the resistance of the arc happens to be greater.

What I claim as new and desire to secure by Letters Patent of the United States, is:

1. An arc device for producing reactions between gases comprising an arc chamber having a wall of porous, refractory material, means for supplying gases under pressure to the space external to said wall, means for operating an electric arc within said arc chamber, and means for carrying away from said chamber gases which have passed through the pores in said wall into said arc.

2. An apparatus for causing gaseous reactions comprising a tube consisting of refractory material and being sufficiently porous to permit effectively of the passage therethrough of gases, enclosing envelope for said tube spaced away therefrom, a conduit for supplying gases under pressure to the space between said tube and envelope, means for operating an electric discharge in said tube capable of causing combination of said gases, and means for carrying away reaction products from said tube.

3. An apparatus for causing gaseous reactions comprising a plurality of chambers having a wall of refractory material and being porous to gases, surrounding envelopes for said respective chambers spaced away from said wall, means for supplying gases to the space between said walls and envelopes, a common collecting chamber, and means for chilling the gases in said collecting chamber.

4. An arc device for combining gases comprising a plurality of arc chambers, a conduit communicating with each of said respective chambers, means for operating a polyphase electric arc having branches in said respective chambers in polyphase relation, and means for passing gases through said arc into said conduit.

5. An apparatus for producing chemical reactions between gases comprising a plurality of tubes, a collecting chamber communicating with each of said tubes, an electrode in each of said tubes remote from said collecting chamber, means for operating a polyphase arc from said respective electrodes having branches in said tubes and a junction in said chamber, and means for supplying gases to be acted upon to said arc.

6. An apparatus for causing gaseous reactions comprising a plurality of chambers having a refractory wall which is porous to gases, surrounding envelopes for said respective chambers spaced away from said wall, means for supplying gases to the space between said walls and envelopes, a common collecting chamber, and means for operating a polyphase arc having a branch in each of said chambers.

7. An apparatus for causing gaseous reactions comprising a plurality of chambers having a wall of refractory material and being porous to gases, surrounding envelopes for said respective chambers spaced away from said wall, means for supplying gases to the space between said walls and envelopes, a common collecting chamber, means for returning cooled products leaving said collecting chamber in part at least to the reaction zone to chill the heated gases therein.

8. An apparatus for causing gaseous reactions comprising one or more reaction chambers, electric ionizing means therein for causing reactions between gases in said chamber or chambers, means for supplying gases thereto and a quantity of refractory material capable at high temperature of setting up short wave length radiations located in said apparatus in contact with gases therein.

9. A gas reaction apparatus comprising a reaction chamber, means for supplying a mixture of gases thereto, means for operating an electric arc therein, and a quantity of refractory material which is capable at high temperatures of setting up short wave length radiations located in heating relation to said arc.

10. A gas reaction apparatus comprising a reaction chamber having a porous wall of highly refractory material, means for supplying gases to said chamber by seepage through said wall, means for operating an electric arc in said reaction chamber, a quantity of the oxide of a rare earth metal in ionizing relation to an arc in said reaction chamber and a collecting chamber communicating with said reaction chamber.

11. A gas reaction apparatus comprising a plurality of reaction chambers, means therein for causing gas reactions, a common collecting chamber, conduits leading from said reaction chambers to said collecting chamber tangentially to said collecting chamber to cause the gases to assume a whirling motion and means for cooling and carrying away said gases.

12. An apparatus for producing reactions between gases comprising a reaction chamber, electrodes therein capable of supporting an arc, means for introducing the gases to be combined radially to said arc along the main axis of said arc, a collection chamber communicating with said reaction chamber and means for suddenly cooling the reaction product at the region of discharge thereof into said collection chamber.

13. A gas reaction apparatus comprising the combination of a source of polyphase alternating current having windings connected to a neutral point, a plurality of reaction chambers, electrodes for said respective chambers having a connection to said windings, means for starting arcs from said electrodes to a common neutral point, and a collection chamber in communication with each of said reaction chambers.

14. An arc device for producing gaseous reactions comprising a plurality of reactions chambers, porous linings therefor, a common collecting chamber communicating with said reaction chambers, means for operating electric arcs in an axial direction in said reaction chambers and means for supplying gases to be acted upon by the arcs into said reaction chambers through the pores distributed in the wall of said reaction chambers thereby cooling said linings and supplying the gases to the arcs without distorting the arcs.

In witness whereof, I have hereunto set my hand this 22nd day of April, 1924.

JAMES M. WEED.